(12) United States Patent
Ash et al.

(10) Patent No.: US 12,132,739 B2
(45) Date of Patent: Oct. 29, 2024

(54) USER LOCATION AUTHENTICATION USING PLACE SIGNATURE

(71) Applicant: NIPPON TELEGRAPH AND TELEPHONE CORPORATION, Tokyo (JP)

(72) Inventors: David Ash, Kirkland, WA (US); Vlad Dabija, Mountain View, CA (US); Shmuel Ur, Shorashim (IL)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 537 days.

(21) Appl. No.: 17/370,484

(22) Filed: Jul. 8, 2021

(65) Prior Publication Data

US 2023/0011017 A1 Jan. 12, 2023

(51) Int. Cl.
*H04L 9/40* (2022.01)

(52) U.S. Cl.
CPC ........ *H04L 63/107* (2013.01); *H04L 63/0236* (2013.01); *H04L 63/0876* (2013.01); *H04L 63/102* (2013.01); *H04L 63/20* (2013.01)

(58) Field of Classification Search
CPC . H04L 63/0236; H04L 63/107; H04L 63/102; H04L 63/20

USPC .......................................................... 726/26
See application file for complete search history.

(56) References Cited

U.S. PATENT DOCUMENTS

| | | | | |
|---|---|---|---|---|
| 11,157,655 | B2* | 10/2021 | Bueno | .................. H04L 9/3239 |
| 2017/0302680 | A1 | 10/2017 | Blswas et al. | |
| 2022/0382839 | A1* | 12/2022 | Vargas | .................. G06N 3/084 |

OTHER PUBLICATIONS

Bhattacharyya et al. (2009) "Biometric Authentication: A Review" International Journal of u- and e- Service, Science and Technology vol. 2, No. 3.

* cited by examiner

*Primary Examiner* — Anthony D Brown

(57) ABSTRACT

A computer-implemented method includes: (i) receiving location information that represents a physical location of a user; (ii) receiving first sensor data that has been generated by a sensor on a client device of the user; (iii) in response to receiving the first sensor data, obtaining second sensor data that has been generated by a sensor on a sensor device and that represents an environmental condition of an area around the physical location; (iv) determining whether the first sensor data matches the second sensor data; and (v) in response to determining that the first sensor data matches the second sensor data, determining that the user is authentic.

20 Claims, 8 Drawing Sheets

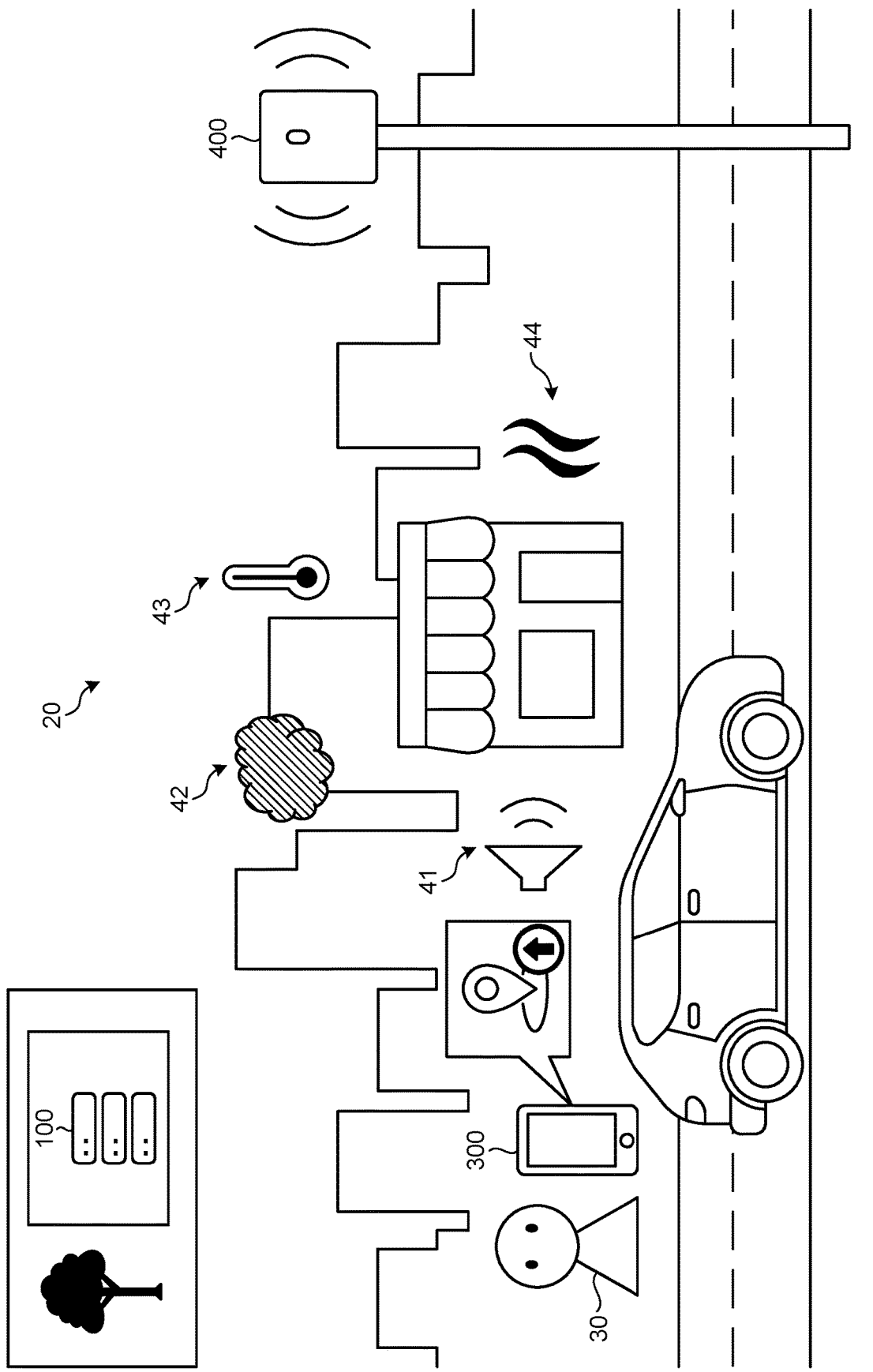

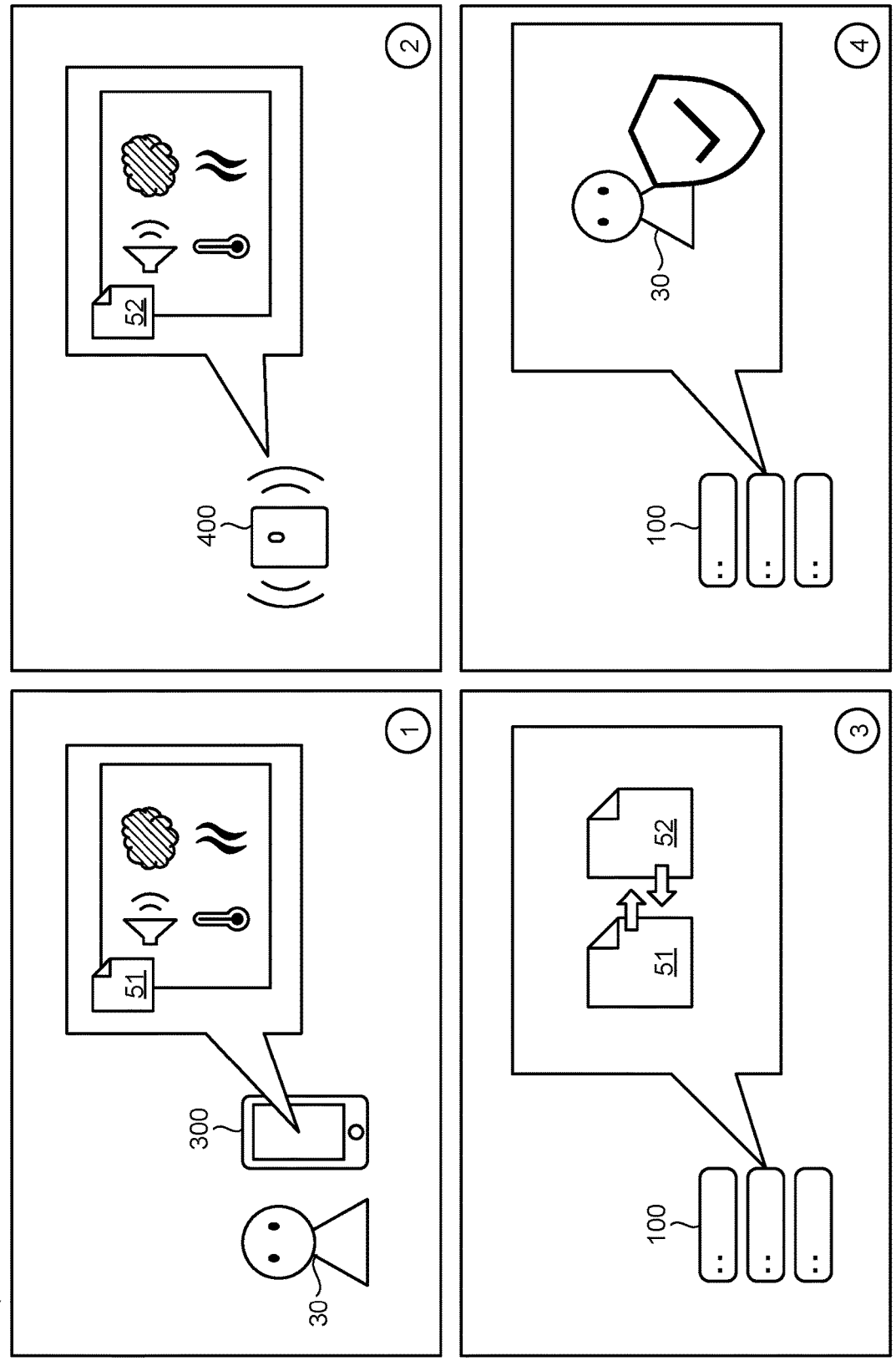

USER LOCATION AUTHENTICATION USING PLACE SIGNATURE

BACKGROUND

This specification relates to user authentication.

User authentication is performed when a user log in to their account. In general, a password is used for user authentication. In addition to a password, sensor data can be used for user authentication. Examples of sensor data for authentication include an image of the user's fingerprint. For example, a user can take an image of the user's fingerprint with a fingerprint sensor on the user's smartphone.

Sensor data can be sent to a system for user authentication. For example, a user can register an image of the user's fingerprint. The system can verify that sensor data sent from a user matches the stored sensor data for authentication. As a result of the matching, the user can log in to their account.

SUMMARY

One aspect of the subject matter disclosed in this specification can be implemented in methods that includes a method for authenticating a user. The method includes: receiving location information that represents a physical location of a user; receiving first sensor data that has been generated by a sensor on a client device of the user; in response to receiving the first sensor data, obtaining second sensor data that has been generated by a sensor on a sensor device and that represents an environmental condition of an area around the physical location; determining whether the first sensor data matches the second sensor data; and in response to determining that the first sensor data matches the second sensor data, determining that the user is authentic.

Other features and aspects of the subject matter will become apparent from the description, the drawings and the claims.

BRIEF DESCRIPTION OF THE DRAWINGS

FIGS. 3A and 3B collectively illustrate an overview of an authentication process according to the present disclosure.

DETAILED DESCRIPTION

Embodiments are described in detail below with reference to the accompanying drawings. Note that the invention is not limited by the embodiments. Features of the various embodiments can be combined in various manners, provided that these features do not conflict with each other. Like elements are indicated by like reference numbers, and overlapping description is omitted.

1. Introduction

When someone logs on to a network, it is generally necessary to authenticate them. Verifying their physical location is often a very good challenge. Because if someone is at one of the physical locations they are known to frequent, like their home, the chance of their being an attacker is quite low.

This verification is sometimes done using Global Positioning System (GPS) coordinates obtained from the person's mobile device. In other solutions, this is done using an Internet Protocol address (IP address), since an IP address often corresponds at least roughly to geographical location.

However, all these methods are far from fool as both GPS readings and IP addresses can be spoofed by hackers. The problem with these methods is that the GPS readings and IP addresses are potentially vulnerable to hacker attacks.

Figure 1:
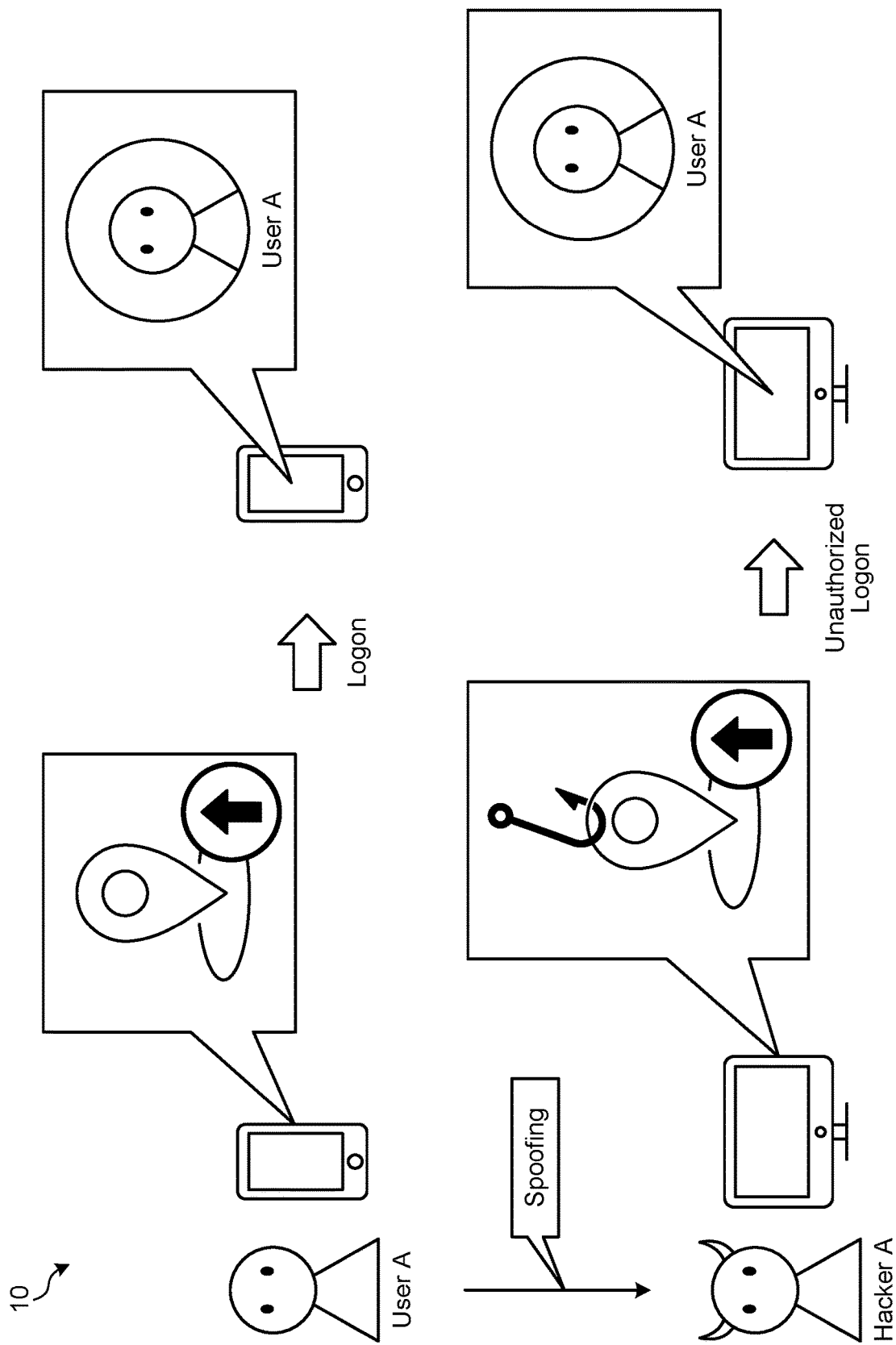
FIG. 1 illustrates an example of a problem with location-based authentication.

FIG. 1 illustrates an example of a problem 10 with location-based authentication. The problem 10 is that the hacker A may be able to spoof GPS readings or IP addresses of the user A. When the user A uses the location-based authentication, the user A submits the GPS reading or IP addresses and logs on to the network. But if the hacker A spoofs GPS reading or IP address, the hacker A can use the spoofed GPS reading or IP addresses for unauthorized logon to the network.

What is needed is a better way to authenticate someone's physical location. To address this problem, an authentication system according to the present disclosure performs one or more authentication processes described below.

2. Environment for User Authentication

First, an environment for user authentication according to the present disclosure will be described with reference to FIG. 2.

Figure 2:
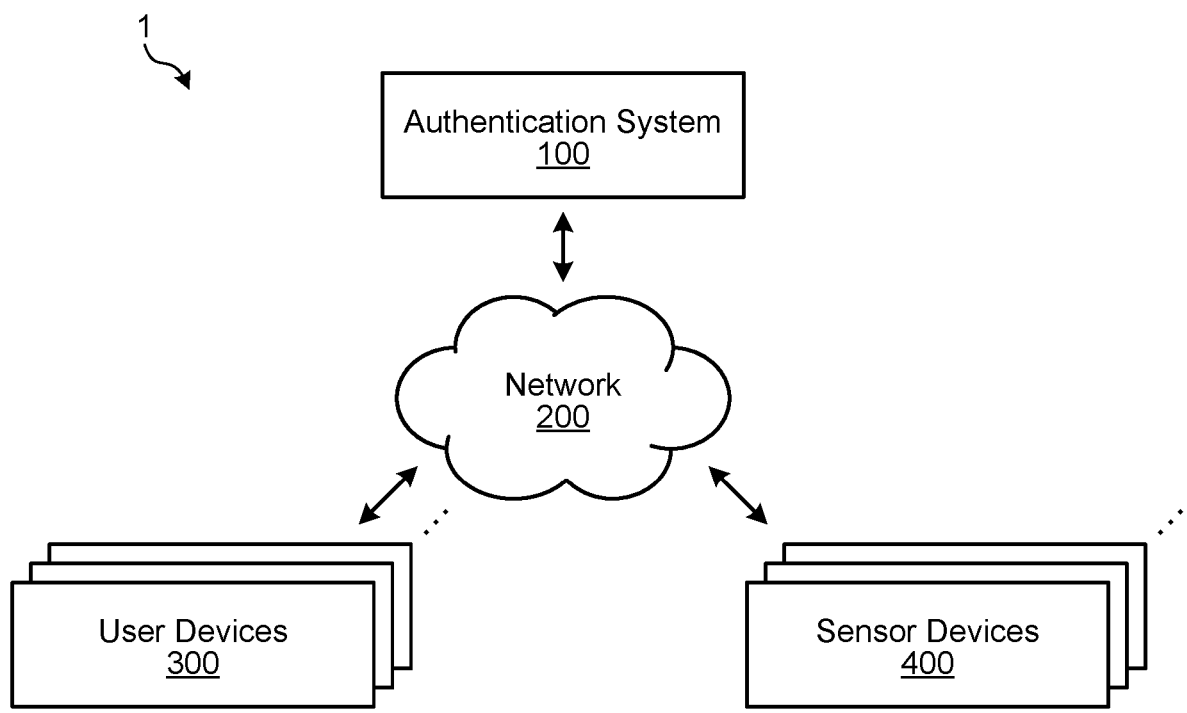
FIG. 2 is a block diagram of an example environment for user authentication.

FIG. 2 is a block diagram of an example environment 1 for user authentication. As illustrated in FIG. 2, the example environment 1 includes an authentication system 100, a network 200, user devices 300 and sensor devices 400.

The authentication system 100 is a system that performs one or more authentication processes. The one or more authentication processes includes a process that authenticate a user. An overview of an authentication process according to the present disclosure will be described in the next section.

The authentication system 100 includes one or more data processing apparatus. The data processing apparatus is, for example, a server. For example, the authentication system 100 is implemented as a network security server. An example configuration of the authentication system 100 will be described in Section 4.

The network 200 is, for example, a network such as local area network (LAN), a wide area network (WAN), or the Internet. The network 200 connects the authentication system 100, the user devices 300, and the sensor devices 400.

A user device 300 is a device that is used by a user. Examples of user devices 300 includes mobile communication devices (e.g., smart phones), personal computers, and tablet computers.

A sensor device 400 is a device that generates sensor data. Examples of a sensor device 400 includes known sensors such as public sensors (e.g., city sensors, existing sensors in urban areas).

3. Overview of Authentication Process

Next, an overview of an authentication process according to the present disclosure will be described with reference to FIGS. 3A and 3B. Note that this overview is not intended to limit the scope of the claims nor the embodiments described in the following sections.

FIGS. 3A and 3B collectively illustrate an overview of an authentication process 20 according to the present disclosure. FIG. 2 is also used to describe the authentication process 20.

Referring to FIG. 3A, in the authentication process 20, a user 30 uses a user device 300 of FIG. 2. The user device 300 is illustrated as a smart phone. As illustrated in FIG. 3A, the user 30 is in a city. The city may be a smart city with the Internet of things (IoT) devices.

A sensor device 400 of FIG. 2 is located in the city. The sensor device 400 is illustrated as a city sensor. In this example, the authentication system 100 of FIG. 2 is in another place. The authentication system 100 is illustrated as a data center. As illustrated in FIG. 3A, environmental conditions in the city include sound 41, pollution 42, temperature 43, or scent 44.

The authentication process 20 checks the authenticity of the user 30. When the user 30 attempts to gain access, a hypothesis as to user 30's physical location is established based on user 30's IP address or GPS information.

Referring to FIG. 3B, subsequent to sending user 30's location information, the authentication process 20 is performed using sensor data of the sound 41, the pollution 42, the temperature 43, or the scent 44. The circled numbers illustrate an example sequence of steps.

At step 1, the user 30 is challenged to open an application on the user device 300 which can access sensors on the user device 300 that can detect certain parameter values in the ambient environment such as (but not limited to) the sound 41, the pollution 42, the temperature 43, or the scent 44.

If the sound 41 is used, then the microphone on the user device 300 can be used. Optionally the user 30 may be directed to point the user device 300 in a particular direction to get data originating from that direction. If the pollution 42, the temperature 43, or the scent 44 are used, then the user device 300 needs to be equipped to corresponding sensors. In this step, the user 30 sends sensor data 51 to the authentication system 100. The data from user device 300 is then uploaded to the authentication system 100 which compares the sensor data 51 to corresponding data available from known locations in the area at that time.

At step 2, the sensor devices 400 are then queried for sensor data that reflects at least one of the sound 41, the pollution 42, the temperature 43, or the scent 44. In this step, the sensor device 400 sends sensor data 52 to the authentication system 100.

When there is not likely to be any sensor device 400 next to the user device 300, the authentication system 100 either (a) takes readings from multiple sensor devices 400 and interpolates for the position of the user device 300, or (b) if only one sensor device 400 is available, then extrapolates the reading for the position of the user device 300 based on any other data available. This is going to be increasingly feasible to do in smart cities.

At step 3, the authentication system 100 determines whether the sensor data 51 matches the sensor data 52.

At step 4, if the sensor data 51 matches the sensor data 52, then the user 30 has passed that part of the check (i.e., authentication of a user 30's location at a point in time).

If a match occurs then the user 30 is likely in the physical location they claim to be. If not, they may be an attacker and further investigation is needed. None of these sensor readings by themselves are very accurate, but the more parameters/sensors are used simultaneously, the more accurate the location identification becomes.

As described above, the authentication process 20 uses sensor data of the sound 41, the pollution 42, the temperature 43, or the scent 44 in user authentication. The condition of the sound 41, the pollution 42, the temperature 43, or the scent 44 changes every hour. Thus, the data used for user authentication varies randomly. As a result, the authentication process 20 can prevent unauthorized logon by a hacker spoofs GPS readings or IP addresses of the user 30.

4. Configuration of Authentication System

Next, an example configuration of the authentication system 100 will be described with reference to FIG. 4.

Figure 4:
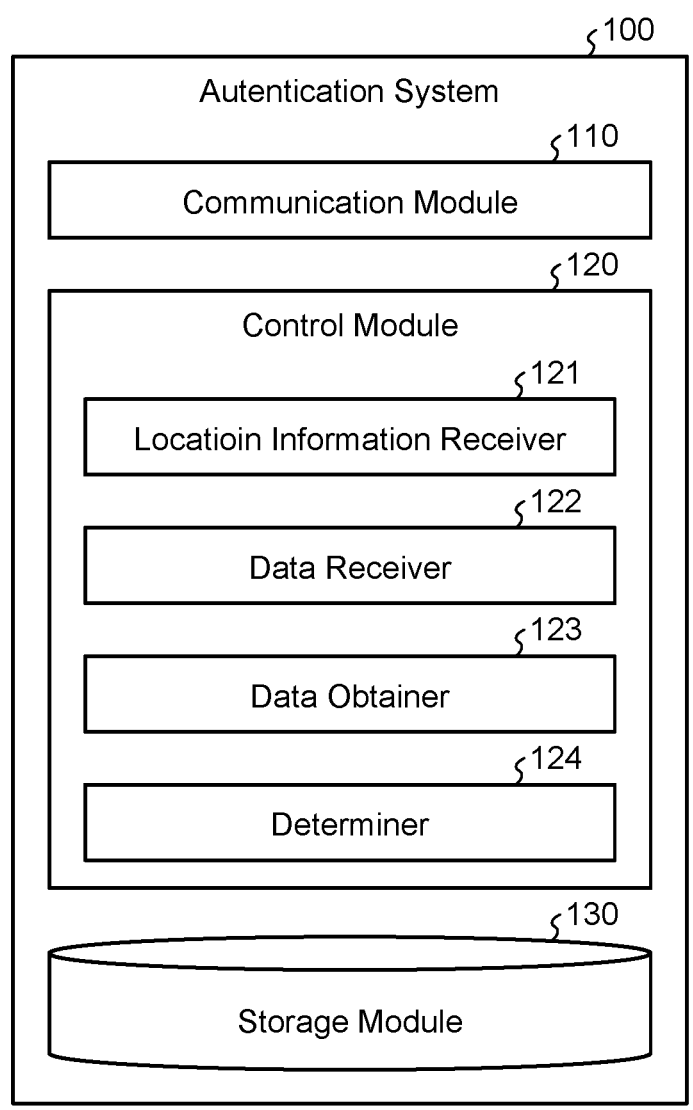
FIG. 4 is a block diagram of an example configuration of an authentication system according to the present disclosure.

FIG. 4 is a block diagram of an example configuration of the authentication system 100 according to the present disclosure. FIG. 2 is also used to describe the example configuration of the authentication system 100.

As illustrated in FIG. 4, the authentication system 100 includes a communication module 110, control module 120, and a storage module 130. The authentication system 100 can include an input module (e.g., a keyboard, a mouse) that receive an input from the administrator of the authentication system 100. Also, the authentication system 100 can include an output module (e.g., a liquid crystal display, an organic light-emitting diode (OLED) display) that displays information to the administrator of the authentication system 100.

4.1. Communication Module 110

The communication module 110 is implemented using, for example, a network interface card (NIC). The communication module 110 is connected to the network 200 in a wired or wireless manner. The communication module 110 can transmit and receive data to and from user devices 300 and sensor devices 400 via the network 200.

4.2. Control Module 120

The control module 120 is a controller. The control module 120 is implemented by one or more processors (e.g., a central processing unit (CPU), a micro processing unit (MPU)) that use a random-access memory (RAM) as a work area and that execute various programs stored in a storage device of the authentication system 100. Also, the control module 120 can be implemented by an integrated circuit, such as an application specific integrated circuit (ASIC), a field programmable gate array (FPGA), or a general purpose graphic processing unit (GPGPU).

As illustrated in FIG. 4, the control module 120 includes a location information receiver 121, a data receiver 122, a data obtainer 123, and a determiner 124. One or more processors of the authentication system 100 can implement each control module by executing instructions stored in one or more memories of the authentication system 100. Data processing performed by each control module is an example, and each control module (e.g., the data obtainer 123) may perform data processing described in association with the other control module (e.g., the determiner 124).

4.2.1. Location Information Receiver 121

The location information receiver 121 receives location information from user devices 300. The location information receiver 121 can store the location information in the storage module 130.

The location information represents a physical location of a user. For, example, the location information includes an IP address or GPS information.

4.2.2. Data Receiver 122

The data receiver 122 receives sensor data that has been generated by a sensor on a user device 300. The data receiver 122 can store the received sensor data in the storage module 130.

For example, when the location information receiver 121 receives location information from the user, the data receiver 122 challenges the user to send sensor data that reflects an environmental condition of an area around the physical location of the user. The environmental condition is, for example, sound, pollution, temperature, or scent.

4.2.3. Data Obtainer 123

The data obtainer 123 obtains sensor data that has been generated by a sensor on a sensor device 400. For example, the data obtainer 123 obtains sensor data from a monitoring system for a particular city. In this example, the sensor device 400 is a known sensor device located in the particular city. The data obtainer 123 can store the obtained sensor data in the storage module 130.

The data obtainer 123 can have access to a network of sensor devices 400. For example, when the data receiver 122 receives first sensor data, the data obtainer 123 obtains second sensor data that has been generated by a sensor on the sensor device 400 and that represents an environmental condition (e.g., sound, pollution, temperature, or scent) of an area around the physical location of the user. The data obtainer 123 can request data readings from multiple sensor devices 400.

4.2.4. Determiner 124

The determiner 124 determines whether first sensor data received by the data receiver 122 matches second sensor data obtained by the data obtainer 123. The determiner 124 can obtain the location information, the first sensor data, and the second sensor data from the storage module 130. When it is determined that the first sensor matches the second sensor data, the determiner 124 determines that the user is authentic.

4.3. Storage Module 130

The storage module 130 is implemented using, for example, a semiconductor memory such as a RAM or a flash memory; or a memory device such as a hard disk or an optical disk. The storage module 130 can be used to store location information received by the location information receiver 121, first sensor data received by the data receiver 122 and second sensor data obtained by the data obtainer 123.

5. Details of Authentication Processes

The overview of an authentication process according to the present disclosure has been described above with reference to FIGS. 3A and 3B. In this section, examples of authentication processes according to the present disclosure will be described in more detail.

Figure 5:
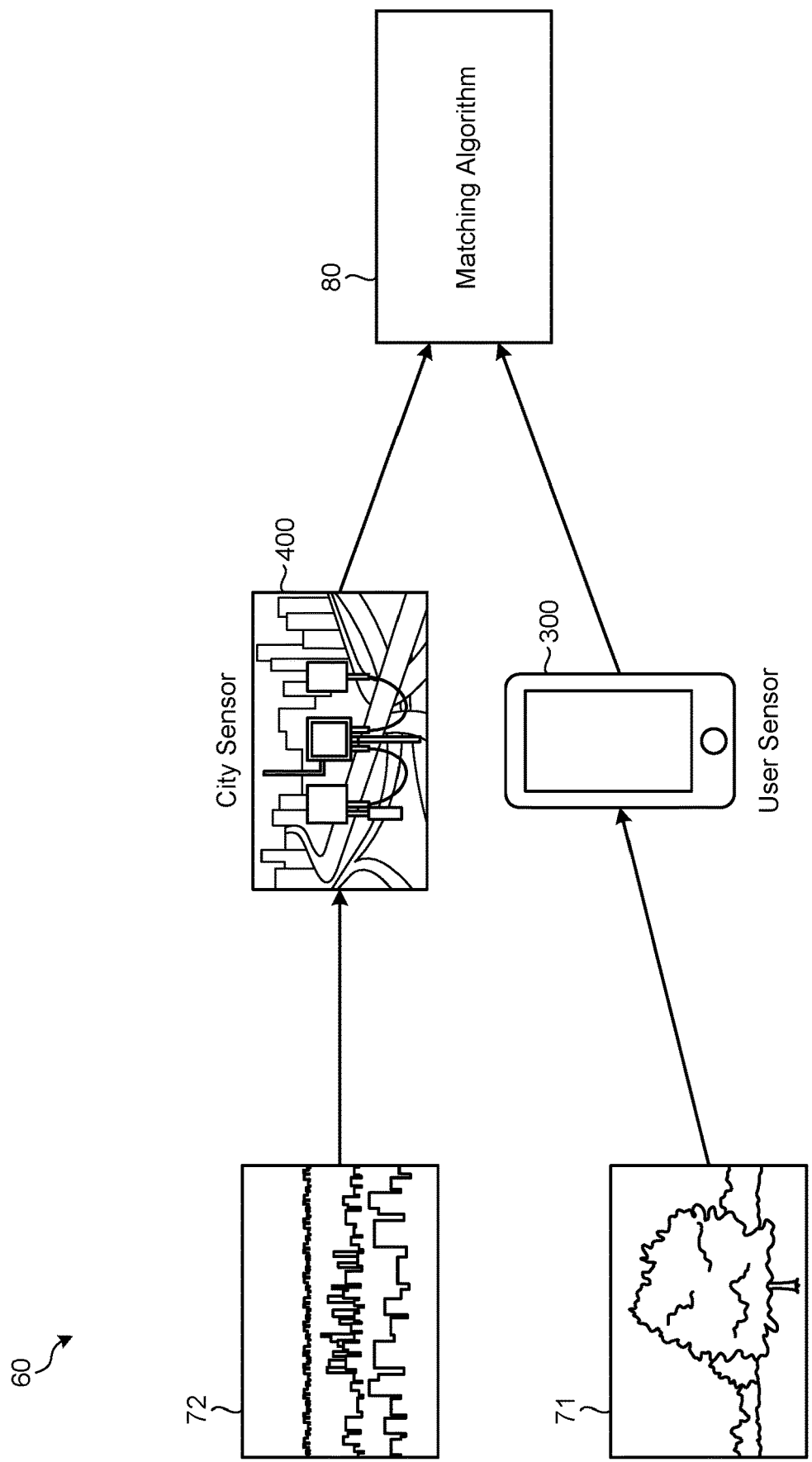
FIG. 5 illustrates an example authentication process according to the present disclosure.

FIG. 5 illustrates an example authentication process 60 according to the present disclosure. FIGS. 2 and 4 are also used to describe the authentication process 60.

In the example authentication process 60, the user device 300 generates sensor data 71. The user device 300 is illustrated as a user sensor. The sensor device 400 generates sensor data 72. The sensor device 400 is illustrated as a city sensor. The matching algorithm 80 is applied to the sensor data 71 and the sensor data 72.

5.1. General Concept of Authentication Process

The user of the user device 300 claims, via their IP address and/or GPS data, to be in a particular location. The user is then challenged to open an application on the user device 300 which can access sensors on the user device 300 to detect sound, pollution, temperature, smell, or other parameters in the surrounding area. Optionally the user may also be directed to point the user device 300 in a particular direction.

The authentication system 100 will also have access to a network of sensor devices 400 in the area which can provide readings as to the ambient sound, pollution or smell in the area. This is more and more available as cities become smarter and equipped with such sensors throughout their area. For example, there could be an aircraft flying by overhead or a car honking in the vicinity which is detected by both the user device 300 and by the sensor devices 400.

The sensor data 71 provided by the user device 300 will likely not exactly match the sensor data 72 provided by the sensor devices 400. However, the matching algorithm 80 can be developed which will estimate to a good degree of accuracy what should be observed at the user's location.

5.2. Sensor Data Obtained from Multiple Censor Devices

The determiner 124 can extrapolate sensor data that represents a most likely environmental condition of the area around the physical location, based on the plurality of second sensor data. The plurality of second sensor data are data obtained by the data obtainer 123, as described above with reference to FIG. 4. Then, the determiner 124 can determine whether the first sensor data received by the data receiver 122 matches the extrapolated sensor data. When it is determined that the first sensor data matches the extrapolated sensor data, the determiner 124 can determine that the user is authentic.

If multiple sensor devices 400 are used, then the accuracy of such estimate will be much higher. In the case of sound, louder sounds would primarily be used for this purpose, as they are likely to be heard in a wide area which includes both the user device 300 and the sensor devices 400.

In the case of sensor devices 400 detecting odor or pollution, the exact composition of gases in the air at the user's location can be compared to that from the sensor devices 400. This composition is likely to vary from location to location. The same is true for the amount of pollution at a specific location, or for temperature. These parameters may vary depending on the environment (location of high-rise buildings may be a factor for example).

When there is not likely to be any public sensor next to the user device 300, the authentication system 100 requests data readings from multiple sensor devices 400 (e.g., multiple similar sensors publicly available in the vicinity of the user device 300). And the authentication system 100 (e.g., the determiner 124) interpolates them to find the most likely value at the position of the user device, accounting for elements such as wind, traffic, shade, etc.

If the authentication system 100 (e.g., the determiner 124) can only find one publicly available sensor for a reading in the vicinity of the user device 300, then it extrapolates that reading adjusting for the distance to the user device position and using any other publicly available data like wind direction and speed, traffic, shade vs direct sunlight, proximity to user's body, etc.

5.3. Authentication System Using Machine Learning

A complete model of the city from the point of view of sound, smell, temperature, pollution, etc. can be developed from data from the sensor devices 400 and Artificial intelligence (AI) algorithms which can interpolate in the most sensible way the likely values of that data at locations that are near to, but not exactly at, a sensor device 400.

This model, which will be possible to develop in a smart city, can then be used to determine whether someone's data from their user device (e.g., their phone) is a likely match to the city data. If it is not a match, as determined by the AI algorithms, then the user may be an attacker.

The determiner 124 can select a location from among a plurality of locations based on a frequency with which the user uses each location. For example, the determiner 124 can obtain data that represent the frequency with which the user uses each location from a monitoring system for a particular city. And the determiner 124 can select the location based on the obtained data. Then, the determiner 124 can learn an environmental condition specific to the selected location from sensor data that has been generated by a sensor on a sensor devices 400 located in an area around the selected location.

The determiner 124 can determine whether the environmental condition represented in first sensor data received from the user device 300 is consistent with the environmental condition specific to the selected location. When it is determined that the environmental condition represented in the first sensor data is consistent with the environmental condition specific to the selected location, the determiner 124 can determine that the user is authentic.

For example, if the location is frequently used by the user, then the authentication system 100 (e.g., the determiner 124) can monitor the sensor devices 400 (e.g., the publicly available sensors) over time and, using machine learning technology. The authentication system 100 (e.g., the determiner 124) can learn specific environmental signatures for that location at different times of day, for example, a characteristic smell, or usual pollution levels correlated with wind speed and direction, or even usual background noise, at specific times of day.

By monitoring these readings over a longer time period, the authentication system 100 (e.g., the determiner 124) can learn an average and normal ranges for these parameters at each time of day, effectively defining a subspace of plausible sensor readings in a multidimensional parameter space. In this case the momentary public sensor readings taken above can be confirmed or even replaced with a known signature of that location at the time the user authenticates themselves on the computer network.

5.4. Defending Against Attacks

The data obtainer 123 can obtain second sensor data has been generated within a threshold period before or after generating first sensor data. The first sensor data is sensor data received by the data receiver 122, as described above with reference to FIG. 4. The second sensor data is sensor data obtained by the data obtainer 123, as described above with reference to FIG. 4.

One possible issue with this approach is that an attacker could get access to data provided by the city sensors by hacking in. This can be resolved by delaying this data for a period of time. The user will provide their data at, for example, 2:00:05 pm and it will be compared with the city sensor data from 2:00:00 pm. However, that data will not be available to an attacker until some time after 2:00:05 pm and therefore cannot be used to fake the authentication process. In addition, more advanced techniques, like the ones using machine learning suggested in the previous paragraph, will provide even better likelihood of accurate matching and authentication.

Finally, in order to avoid the possibility that a hacker can have access to the same sensors as the authenticating authority, the combination of parameters used for authentication (and therefore requested readings from the user device 300) can be varied randomly making it that much harder for the intruder to present the same set of parameter readings as requested for that particular network access event.

6. Flowchart of the Authentication Process

Next, a flowchart of an example of an authentication process according to the present disclosure will be described with reference to FIG. 6.

Figure 6:
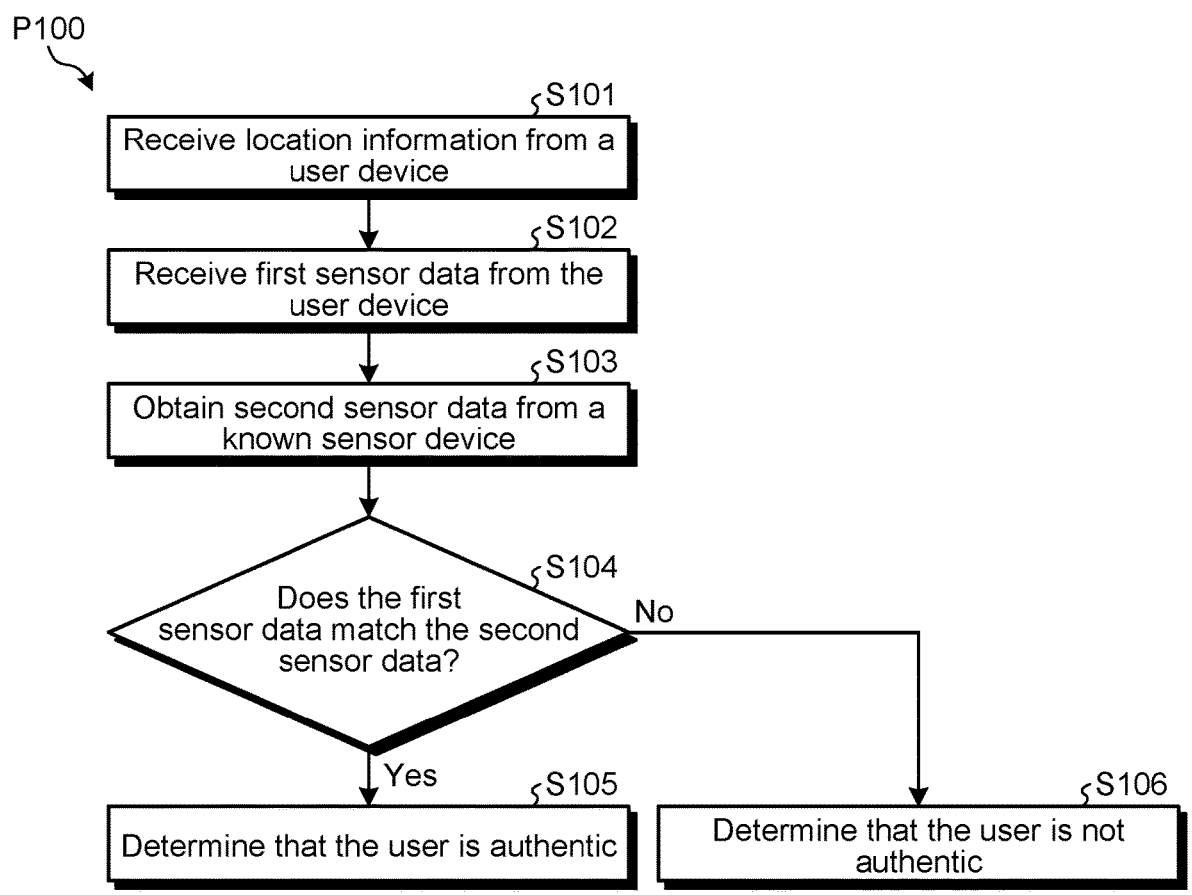
FIG. 6 is a flowchart of an example process for authenticating a user.

FIG. 6 is a flowchart of an example process P100 for authenticating a user. The process P100 can be performed, for example, by the authentication system 100 described above with reference to FIGS. 2 and 4.

As illustrated in FIG. 6, first, location information that represents a physical location of a user is received from a user device (Step S101). For example, the location information receiver 121 of FIG. 4 receive the location information from a user device 300 of FIG. 2.

Then, first sensor data that has been generated by a sensor on a user device of the user is received from the user device (Step S102). For example, the data receiver 122 receives the first sensor data from the user device 300.

In response to receiving the first sensor data, second sensor data that has been generated by a sensor on a known sensor device and that represents an environmental condition of an area around the physical location is obtained from the known sensor device (Step S103). For, example, when the data receiver 122 receives the first sensor data, the data obtainer 123 of FIG. 4 obtains the second sensor data. As described in Section 5.2, sensor data that represents a most likely environmental condition of the area around the physical location may be extrapolated based on the plurality of second sensor data.

Then, a determination is made as to whether the first sensor data matches the second sensor data (Step S104). For, example, the determiner 124 of FIG. 4 determines whether the first sensor data matches the second sensor data. In addition or alternatively, a determination can be made as to whether the first sensor data matches the extrapolated sensor data.

If the first sensor data matches the second sensor data ("Yes" branch of Step S104), a determination is made that the that the user is authentic (Step S105). For example, the determiner 124 determines that the user is authentic. In addition or alternatively, if the first sensor data matches the extrapolated sensor data, a determination can be made that the user is authentic.

If the first sensor data does not match the second sensor data ("No" branch of Step S104), a determination is made that the that the user is not authentic (Step S106). In addition or alternatively, if the first sensor data does not match the extrapolated sensor data, a determination can be made that the user is not authentic.

As described in Section 5.3, the process P100 can further include (i) selecting a location from among a plurality of locations based on a frequency with which the user uses each location, (ii) learning an environmental condition specific to the selected location from sensor data that has been generated by a sensor on a known sensor device located in an area around the selected location, (iii) determining whether the environmental condition represented in the first sensor data is consistent with the environmental condition specific to the selected location, and (iv) in response to determining that the environmental condition represented in the first sensor data is consistent with the environmental condition specific to the selected location, determining that the user is authentic.

7. Advantages

The one or more authentication processes according to the present disclosure, is provided as a solution to the problem with location-based authentication. This solution presents essentially an approach for verifying someone's physical location. Its advantage over other solutions to that problem is that the configuration of sound, pollution, temperature, odor, and/or other parameters at a location is likely to be fairly unique. It is essentially a shared secret that will be known only to sensors in that area at that time.

The approach will be especially strong if multiple sensors cooperate to determine the exact parameters values that should be present at the user's location at the appropriate point in time. The advent and grows of smart cities technology and devices is likely to make this solution applicable in more and more locations over time.

This solution allows for location authentication in a wide range of situations based on a large number of parameters that can be varied randomly and authenticated independently, even based on a model of the environment that has been pre-learned by the authentication authority.

8. Others

Of the processes described in the embodiment, a part of the processes that are mentioned as being automatically performed can also be manually performed, or the whole or a part of the processes that are mentioned as being manually performed can also be automatically performed using known methods. Furthermore, the flow of the processes, the specific names, and the information containing various kinds of data or parameters indicated in the above specification and drawings can be arbitrarily changed unless otherwise stated. For example, the various kinds of information illustrated in each of the drawings are not limited to the information illustrated in the drawings.

The components of each unit illustrated in the drawings are only for conceptually illustrating the functions thereof and are not always physically configured as illustrated in the drawings. In other words, the specific shape of a separate or integrated device is not limited to the drawings. Specifically, all or part of the device can be configured by functionally or physically separating or integrating any of the units depending on various loads or use conditions.

9. Hardware Configuration

Figure 7:
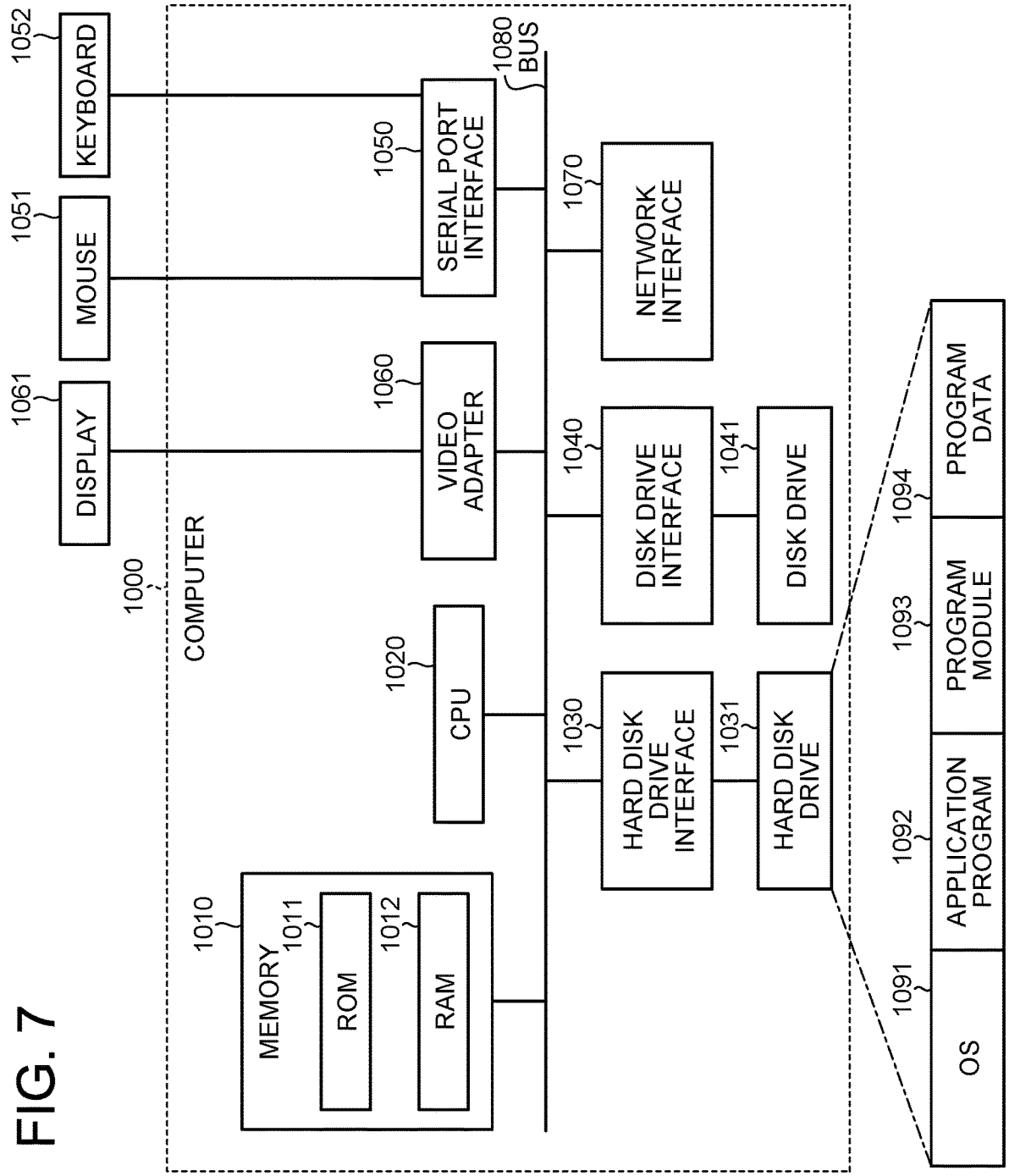
FIG. 7 illustrates an example hardware configuration of a computer.

FIG. 7 illustrates an example hardware configuration of a computer 1000. The systems and methods described in this specification is implemented, for example, using the computer 1000 illustrated in FIG. 7.

A computer program product that describes processing executed by the authentication system 100 in a computer-executable language, can be created. The computer program product contains instructions that, when executed, perform one or more methods, such as those described above. As one embodiment, the authentication system 100 can be implemented by installing a authentication program (i.e., a computer program product for authentication) that executes the one or more authentication processes described above as packaged software and online software into a desired computer. For example, by causing a data-processing device to execute the authentication program described above, the data-processing device can function as the authentication system 100. The data-processing device mentioned here includes a desktop or a laptop personal computer. Besides, mobile communication terminals such as a smartphone, a mobile phone, and a personal handyphone system (PHS), slate terminals such as a personal digital assistant (PDA), and the like, are in the category of the data-processing device. In addition, functions of the authentication system 100 may be implemented in a cloud server.

The computer 1000 illustrated in FIG. 7 is an example of a computer that executes the authentication program. The computer 1000 includes, for example, a memory 1010, a CPU 1020, a hard disk drive interface 1030, a disk drive interface 1040, a serial port interface 1050, a video adapter 1060, and a network interface 1070. Those units are connected one another by a bus 1080.

The memory 1010 includes a read only memory (ROM) 1011 and a RAM 1012. The ROM 1011 stores therein, for example, a boot program of a basic input output system (BIOS) and the like. The hard disk drive interface 1030 is connected to a hard disk drive 1031. The disk drive interface 1040 is connected to a disk drive 1041. For example, attachable/detachable storage media such as a magnetic disk and an optical disk are inserted into the disk drive 1041. For example, a mouse 1051 and a keyboard 1052 are connected to the serial port interface 1050. For example, a display 1061 is connected to the video adapter 1060.

The hard disk drive 1031 stores therein, for example, an operating system (OS) 1091, an application program 1092, a program module 1093, and program data 1094. Each piece of information described in the embodiments, is stored in, for example, the hard disk drive 1031 and the memory 1010.

A computer program product for authentication is tangibly embodied in a non-transitory computer readable storage device. In the example of FIG. 7, the authentication program is stored in the hard disk drive 1031 as, for example, the program module 1093 that describes commands executed by the computer 1000. Specifically, the program module 1093 that describes each process executed by the authentication system 100 described in the embodiments, is stored in the hard disk drive 1031.

Data used in data processing by the authentication program is stored as the program data 1094 in, for example, the hard disk drive 1031. The CPU 1020 reads the program module 1093 and the program data 1094 stored in the hard disk drive 1031 into the RAM 1012 as needed, and executes each procedure described above.

The program module 1093 and the program data 1094 according to the authentication program are not always stored in the hard disk drive 1031, and may be stored in, for example, an attachable/detachable storage medium and be read by the CPU 1020 via the disk drive 1041 and the like. The program module 1093 and the program data 1094 according to the authentication program may be stored in the other computer connected via networks such as a LAN and a WAN, and may be read by the CPU 1020 via the network interface 1070.

10. Summary of Embodiments

As described above, the authentication system 100 according to the present disclosure includes: (i) the location information receiver 121, (ii) the data receiver 122, (iii) the data obtainer 123, and (iv) the determiner 124.

In at least one embodiment, the location information receiver 121 receives location information that represents a physical location of a user. In at least one embodiment, the data receiver 122 receives first sensor data that has been generated by a sensor on a client device of the user. In at least one embodiment, when the data receiver 122 the first sensor data, the data obtainer 123 obtains second sensor data that has been generated by a sensor on a sensor device and that represents an environmental condition of an area around the physical location. In at least one embodiment, the determiner 124 determines whether the first sensor data matches the second sensor data. When it is determined that the first sensor data matches the second sensor data, the determiner 124 determines that the user is authentic.

In some embodiments, the second sensor data has been generated within a threshold period before or after generating the first sensor data.

In some embodiments, the environmental condition is sound, pollution, temperature, or scent.

In some embodiments, the location information includes an IP address or GPS information.

In some embodiments, the data obtainer 123 obtains the second sensor data from a monitoring system for a particular city. In some embodiments, the sensor device is located in the particular city.

In some embodiments, the second sensor data includes a plurality of second sensor data that have been generated by a plurality of sensors on a plurality of sensor devices and that represent a plurality of environmental conditions of the area around the physical location. In some embodiments, the determiner 124 extrapolates sensor data that represents a most likely environmental condition of the area around the physical location, based on the plurality of second sensor data. Then, the determiner 124 determines whether the first sensor data matches the extrapolated sensor data. When it is determined that the first sensor data matches the extrapolated sensor data, the determiner 124 determines that the user is authentic.

In some embodiments, the determiner 124 selects a location from among a plurality of locations based on a frequency with which the user uses each location. Then, the determiner 124 learns an environmental condition specific to the selected location from sensor data that has been generated by a sensor on a sensor device located in an area around the selected location. Then, the determiner 124 determines whether the environmental condition represented in the first sensor data is consistent with the environmental condition specific to the selected location. When it is determined that the environmental condition represented in the first sensor data is consistent with the environmental condition specific to the selected location, the determiner 124 determines that the user is authentic.

Although various embodiments have been described in detail herein with reference to the accompanying drawings, theses embodiments are examples and are not intended to limit the invention to these embodiments. The features described herein can be implemented in various ways, including various modifications and improvements based on the knowledge of a person skilled in the art.

What is claimed is:

1. A computer-implemented method comprising:
   receiving location information that represents a physical location of a user;
   receiving first sensor data that has been generated by a first sensor on a client device of the user, wherein the first sensor data represents a first environmental condition of an area around the physical location of the user, and the first environmental condition of the area is distinct from the location information of the user;
   in response to receiving the first sensor data, obtaining second sensor data that has been generated by a second sensor on a sensor device, wherein the second sensor data represents a second environmental condition of the area around the physical location, and the first sensor data and the second sensor data represent a same type of environmental condition;
   determining whether the first sensor data matches the second sensor data based on respective values of the first sensor data and the second sensor data; and
   in response to determining that the first sensor data matches the second sensor data, determining that the user is authentic.

2. The method of claim 1 wherein the second sensor data has been generated within a threshold period before or after generating the first sensor data.

3. The method of claim 1 wherein the first environmental condition is sound, pollution, temperature, or scent.

4. The method of claim 1 wherein the location information includes an Internet Protocol (IP) address or global positioning system (GPS) information.

5. The method of claim 1 wherein obtaining the second sensor data includes obtaining the second sensor data from a monitoring system for a particular city, and wherein the sensor device is located in the particular city.

6. The method of claim 1 wherein the second sensor data comprises a plurality of second sensor data that have been generated by a plurality of sensors on a plurality of sensor devices and that represent a plurality of environmental conditions of the area around the physical location; and wherein determining whether the first sensor data matches the second sensor data includes:
   extrapolating sensor data that represents a most likely environmental condition of the area around the physical location, based on the plurality of second sensor data; and
   determining whether the first sensor data matches the extrapolated sensor data.

7. The method of claim 1 further comprising:
   selecting a location from among a plurality of locations based on a frequency with which the user uses each location;
   learning an environmental condition specific to the selected location from sensor data that has been generated by a third sensor on a third sensor device located in an area around the selected location;
   determining whether the environmental condition represented in the first sensor data is consistent with the environmental condition specific to the selected location;
   in response to determining that the environmental condition represented in the first sensor data is consistent with the environmental condition specific to the selected location, determining that the user is authentic.

8. A system comprising:
   one or more processors; and
   one or more memory including instructions that when executed cause the one or more processors to:
   receive location information that represents a physical location of a user;
   receive first sensor data that has been generated by a first sensor on a client device of the user, wherein the first sensor data represents a first environmental condition of an area around the physical location of the user, and the first environmental condition of the area is distinct from the location information of the user;
   in response to receiving the first sensor data, obtain second sensor data that has been generated by a second sensor on a sensor device, and wherein the second sensor data represents a second environmental condition of the area around the physical location, and the first sensor data and the second sensor data represent a same type of environmental condition;
   determine whether the first sensor data matches the second sensor data based on respective values of the first sensor data and the second sensor data; and
   in response to determining that the first sensor data matches the second sensor data, determine that the user is authentic.

9. The system of claim 8 wherein the second sensor data has been generated within a threshold period before or after generating the first sensor data.

10. The system of claim 8 wherein the first environmental condition is sound, pollution, temperature, or scent.

11. The system of claim 8 wherein the location information includes an Internet Protocol (IP) address or global positioning system (GPS) information.

12. The system of claim 8 wherein obtaining the second sensor data includes obtaining the second sensor data from a monitoring system for a particular city, and wherein the sensor device is located in the particular city.

13. The system of claim 8 wherein the second sensor data comprises a plurality of second sensor data that have been generated by a plurality of sensors on a plurality of sensor devices and that represent a plurality of environmental conditions of the area around the physical location; and wherein determining whether the first sensor data matches the second sensor data includes:
  extrapolating sensor data that represents a most likely environmental condition of the area around the physical location, based on the plurality of second sensor data; and
  determining whether the first sensor data matches the extrapolated sensor data.

14. The system of claim 8 wherein the instructions further comprise instructions that when executed cause the one or more processors to:
  select a location from among a plurality of locations based on a frequency with which the user uses each location;
  learn an environmental condition specific to the selected location from sensor data that has been generated by a third sensor on a third sensor device located in an area around the selected location;
  determine whether the environmental condition represented in the first sensor data is consistent with the environmental condition specific to the selected location;
  in response to determining that the environmental condition represented in the first sensor data is consistent with the environmental condition specific to the selected location, determine that the user is authentic.

15. A computer program product tangibly embodied in a non-transitory computer-readable medium comprising instructions that, when executed by a processor, cause the processor to:
  receive location information that represents a physical location of a user;
  receive first sensor data that has been generated by a first sensor on a client device of the user, wherein the first sensor data represents a first environmental condition of an area around the physical location of the user, and the first environmental condition of the area is distinct from the location information of the user;
  in response to receiving the first sensor data, obtain second sensor data that has been generated by a second sensor on a sensor device and wherein the second sensor data represents a second environmental condition of the area around the physical location, and the first sensor data and the second sensor data represent a same type of environmental condition;
  determine whether the first sensor data matches the second sensor data based on respective values of the first sensor data and the second sensor data; and
  in response to determining that the first sensor data matches the second sensor data, determine that the user is authentic.

16. The product of claim 15 wherein the second sensor data has been generated within a threshold period before or after generating the first sensor data.

17. The product of claim 15 wherein the first environmental condition is sound, pollution, temperature, or scent.

18. The product of claim 15 wherein the location information includes an Internet Protocol (IP) address or global positioning system (GPS) information.

19. The product of claim 15 wherein obtaining the second sensor data includes obtaining the second sensor data from a monitoring system for a particular city, and wherein the sensor device is located in the particular city.

20. The product of claim 15 wherein the second sensor data comprises a plurality of second sensor data that have been generated by a plurality of sensors on a plurality of sensor devices and that represent a plurality of environmental conditions of the area around the physical location; and wherein determining whether the first sensor data matches the second sensor data includes:
  extrapolating sensor data that represents a most likely environmental condition of the area around the physical location, based on the plurality of second sensor data; and
  determining whether the first sensor data matches the extrapolated sensor data.

* * * * *